United States Patent
Howlett

(10) Patent No.: US 9,286,632 B1
(45) Date of Patent: *Mar. 15, 2016

(54) CAPTURING AND PUBLISHING PRODUCT IMAGERY

(71) Applicant: Zappos IP, Inc., Henderson, NV (US)

(72) Inventor: Jason R. Howlett, Louisville, KY (US)

(73) Assignee: Zappos IP, Inc., Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,385

(22) Filed: Feb. 11, 2015

Related U.S. Application Data

(63) Continuation of application No. 13/423,762, filed on Mar. 19, 2012, now Pat. No. 8,963,992.

(51) Int. Cl.
*G06Q 30/06* (2012.01)
*G06F 17/30* (2006.01)

(52) U.S. Cl.
CPC ........ *G06Q 30/0627* (2013.01); *G06F 17/3089* (2013.01)

(58) Field of Classification Search
CPC .................................................. H04N 5/23238
See application file for complete search history.

(56) References Cited

U.S. PATENT DOCUMENTS

| | | | | |
|---|---|---|---|---|
| 6,035,323 A * | 3/2000 | Narayen | ........... | G06F 17/30893 709/201 |
| 6,223,190 B1 * | 4/2001 | Aihara | ................... | G06F 17/211 348/207.99 |
| 6,779,153 B1 * | 8/2004 | Kagle | ................. | G06F 17/2247 715/235 |
| 6,930,709 B1 * | 8/2005 | Creamer | ........... | H04N 1/00214 348/207.1 |
| 7,197,531 B2 * | 3/2007 | Anderson | .......... | H04N 1/00148 348/207.1 |
| 7,443,418 B2 * | 10/2008 | Bryant | ................... | G06Q 40/04 348/207.1 |
| 7,466,347 B2 * | 12/2008 | Tsunoda | ........... | H04N 1/00148 348/231.2 |
| 8,392,957 B2 * | 3/2013 | Holt | .................. | G06F 17/30265 348/207.99 |
| 2010/0029326 A1 * | 2/2010 | Bergstrom | ............. | G11B 27/11 455/556.1 |
| 2014/0165614 A1 * | 6/2014 | Manning | ................. | F25D 29/00 62/62 |

* cited by examiner

*Primary Examiner* — Sath V Perungavoor
*Assistant Examiner* — James Pontius
(74) *Attorney, Agent, or Firm* — Thomas | Horstemeyer, LLP

(57) ABSTRACT

Disclosed are various embodiments for capturing item imagery and generating corresponding content pages. A plurality of images is captured from an image capture apparatus that includes a plurality of image capture devices positioned at various angles relative to an item. The images are associated with an item identifier and/or image identifier. A content page based on a page template is then generated that includes references to at least a subset of the images.

20 Claims, 7 Drawing Sheets

CAPTURING AND PUBLISHING PRODUCT IMAGERY

CROSS-REFERENCE TO RELATED APPLICATION

This application is a continuation of and claims priority to U.S. application Ser. No. 13/423,762 filed on Mar. 19, 2012 and entitled "Capturing and Publishing Product Imagery", which is incorporated by reference herein in its entirety.

BACKGROUND

Online merchants can offer a large number of products for which product imagery is accumulated for display via product detail pages and other places in a site of the merchant. In some cases, an online merchant may offer a large number of products from the same or similar product type, for which product imagery is captured and displayed according to design guidelines that call for consistent image capture and framing of the product. For example, an online merchant offering shoes, boots, and other footwear may present product imagery in product detail pages according to a page template that provides consistent layout as well as look and feel of imagery across various items from a product catalog.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to capturing imagery for an item. As used herein, the term "item" may refer to any good, product, service, software item, multimedia item, or other item that may be offered for sale, purchase, rental, lease, download, and/or any other form of consumption as may be appreciated. In the depicted examples, systems and methods that capture imagery of items from various angles and generate a product detail page that incorporates the various captured images.

Figure 1:
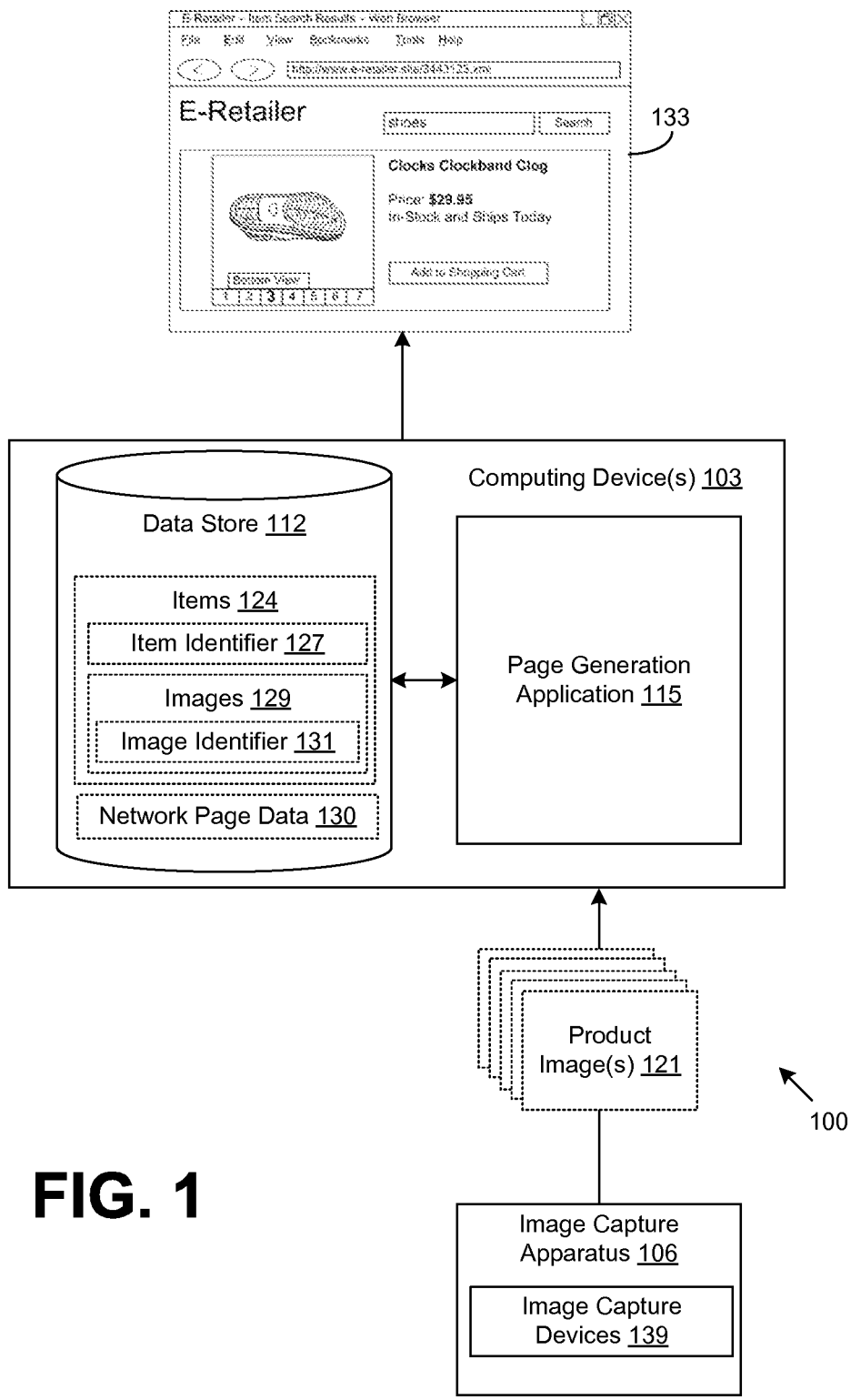
FIG. 1 is a drawing of a computing environment according to various embodiments of the present disclosure.

With reference to FIG. 1, shown is a computing environment 100 according to various embodiments. The computing environment 100 includes one or more computing devices 103 in data communication with an image capture apparatus 106. In one embodiment, the one or more computing devices 103 are in communication with the image capture apparatus 106 via a network, which can include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below. The components executed on the computing device 103, for example, include a page generation application 115 and other applications, services, processes, systems, engines, or functionality not discussed in detail herein. The page generation application 115 is executed to process product images 121 captured by an image capture apparatus 106 and generate content pages 133 that describe items and incorporate one or more of the product images 121 captured by the image capture apparatus 106.

The data stored in the data store 112 includes, for example, items 124, network page data 130 and potentially other data. The items 124 may include any data relating to items 124 that are offered for sale, rental, lease, download, and/or any other form of consumption through a network site. The items 124 may include data such as titles, descriptions, keywords, metadata, weights, customer reviews, multimedia, and other data relating to the items 124. The items 124 can also be thought of as entries in an electronic product catalog of products that are offered by an online merchant via an electronic commerce system. Items 124 can be indexed by an item identifier 127, which can uniquely identify an item in a product catalog or other data set. An item identifier 127 can comprise a product style identifier that identifies the product within a product catalog as well as a style of the product (e.g., color), a product name, serial number, or any other data that uniquely identifies a product in a product catalog.

Images 129 may be associated with the items 124. The images 129 may include a plurality of images 129 related to each of the items 124. For example, the images 129 may depict multiple views, angles, versions, options, colors, features, accessories, and any other type of images 129 that may be associated with items 124. Each of the images 129 is also associated with an image identifier 131, which can identify a particular view and/or product that an image 129 represents. For example, an image identifier can comprise a combination of an item identifier 127 as well as an identifier that enables the page generation application 115 to identify whether the image represents a top view, bottom view, left side view, right side view, perspective view, or any other view of a product as can be appreciated. As another example, in the case of product imagery of footwear apparel, such an identifier can also identify whether the image 129 represents a view that includes one piece of footwear and/or two pieces of footwear. Accordingly, in this way, the page generation application 115 can generate a product detail page, for example, that places images 129 of a product in the appropriate locations in a page template.

The network page data 130 may include any type of data related to the generation of content pages 133. Such data may include, for example, templates, executable code, interpreted code, hypertext markup language (HTML), extensible markup language (XML), images, video, text, graphics, and any other type of data that may be used in generating content pages. The network page data 130 can include, for example, a page template from which a product detail page with various data and content about an item 124, including one or more images 129 associated with the item 124, can be generated by the page generation application 115 when requested by a user accessing a site via a client.

Such a client can be representative of a plurality of client devices that may be coupled to a network in communication with the computing device 103. The client may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client can render a requested content page that is generated by the page generation application 115 or another application that is configured to serve content to a client over a network.

The client may be configured to execute various applications such as a browser and/or other applications. The browser may be executed in a client, for example, to access and render content pages 133, such as web pages or other network content served up by the computing device 103 and/or other servers, thereby generating a rendered network page on the display. The client may be configured to execute applications beyond the browser such as, for example, email applications, instant message applications, and/or other applications.

The image capture apparatus 106 comprises one or more image capture devices 139 that capture product images 121 of an item and transmits the imagery for processing to the page generation application 115. The page generation application 115 can initiate capture of the product images 121 by the image capture devices 139 and then process the images so that they are suitable for publication in a content page 133 such as a product detail page. In one embodiment, the page generation application 115 can initiate capture of a plurality of images from various angles of an item and then crop the images to a common pixel resolution. In some embodiments, an online merchant may employ design guidelines that require that product imagery displayed in a product detail page to resized or cropped to a specific resolution. Additionally, these design guidelines may also require that images of one or more sides, or views, of an item 124 be captured and displayed in conjunction with a product detail page. Accordingly, the image capture apparatus 106 can capture imagery from various sides of an item substantially simultaneously and transmit the product images 121 to the page generation application 115. The configuration of one example of such an image capture apparatus 106 is discussed in more detail in FIGS. 2-3.

Figure 2:
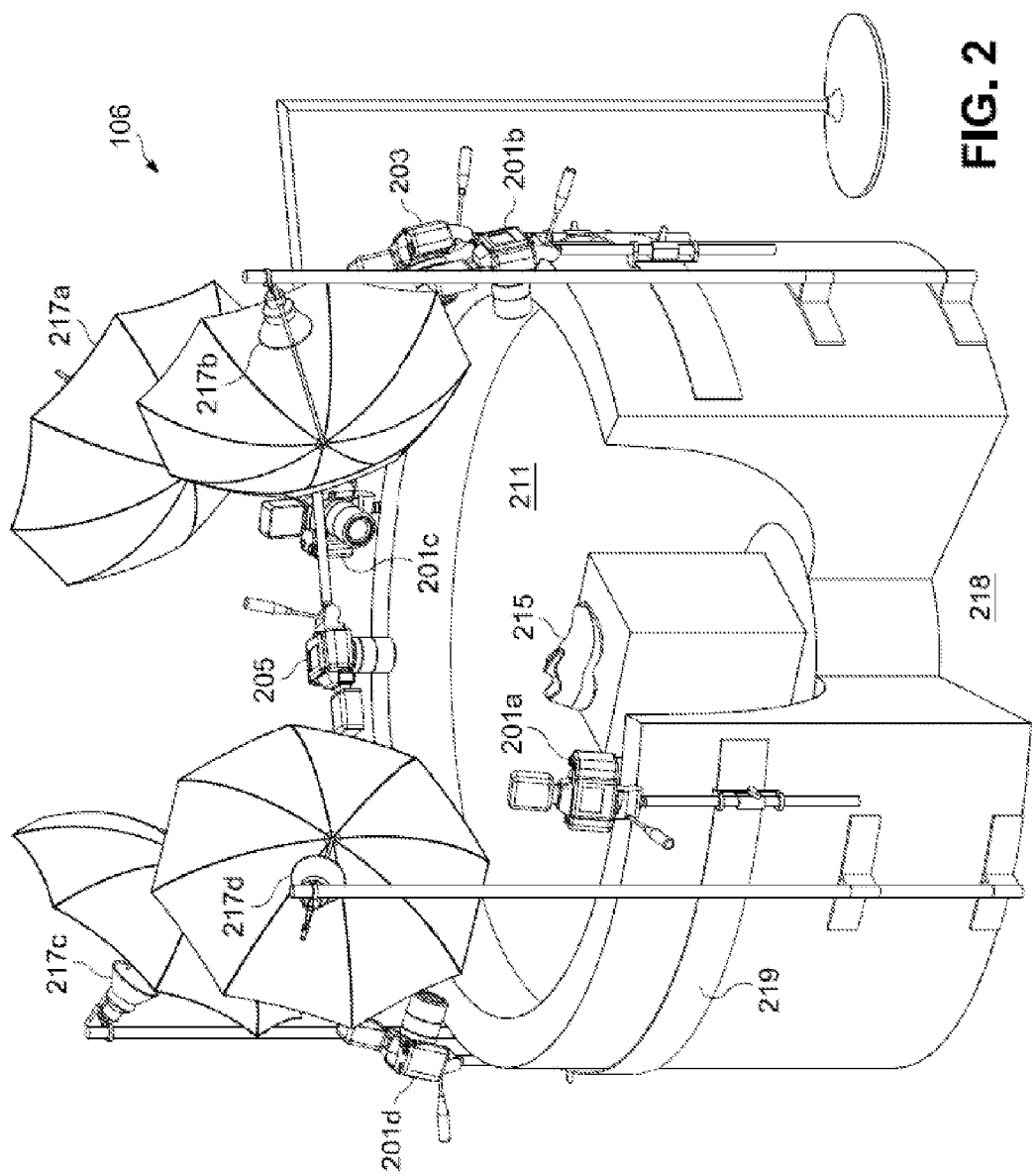
FIGS. 2-3 are drawings of an image capture apparatus employed in the computing environment of FIG. 1 according to various embodiments of the present disclosure.

Therefore, with reference to FIG. 2, shown is an example of an image capture apparatus 106 according to various embodiments of the disclosure. In the depicted example, the image capture apparatus 106 comprises a plurality of image capture devices 201a, 201b, 201c, 201d, 203 positioned around a perimeter of a semi-spherical structure 211. The semi-spherical structure 211 includes an opening 218 through which personnel can enter and/or leave the image capture apparatus to position an item 215 within the structure at a target position. An additional image capture device 205 is positioned above the semi-spherical structure 211 above and aimed at the target position. The target position is substantially centrally located within the semi-spherical structure 211 and is a location at which an item 215 can be positioned so that images can be captured by one or more of the image capture devices. The interior surface of the semi-spherical structure 211 can also be configured with a background that is colored according to a desired background color for product images 121 that are published in a content page generated by the page generation application 115.

The image capture apparatus 106 also includes a lighting system 217 that provides lighting for image capture of the item 215 positioned within the semi-spherical structure 211. The lighting system 217 can include or more light sources that are dissipated across the semi-spherical structure 211 by one or more lighting umbrellas. Accordingly, the page generation application 115 can activate the lighting system 217 as well as initiate capture of images by the image capture devices that are lighted by the lighting system 217 such that the light sources are evenly dispersed and the various product images that are captured are similarly lighted. The image capture apparatus 106 also includes a railing system 219 to which the various image capture devices can be mounted. In this way, the angular positioning of the image capture devices can be adjusted relative to the target position can be adjusted depending upon the desired framing of the product images.

Figure 3:
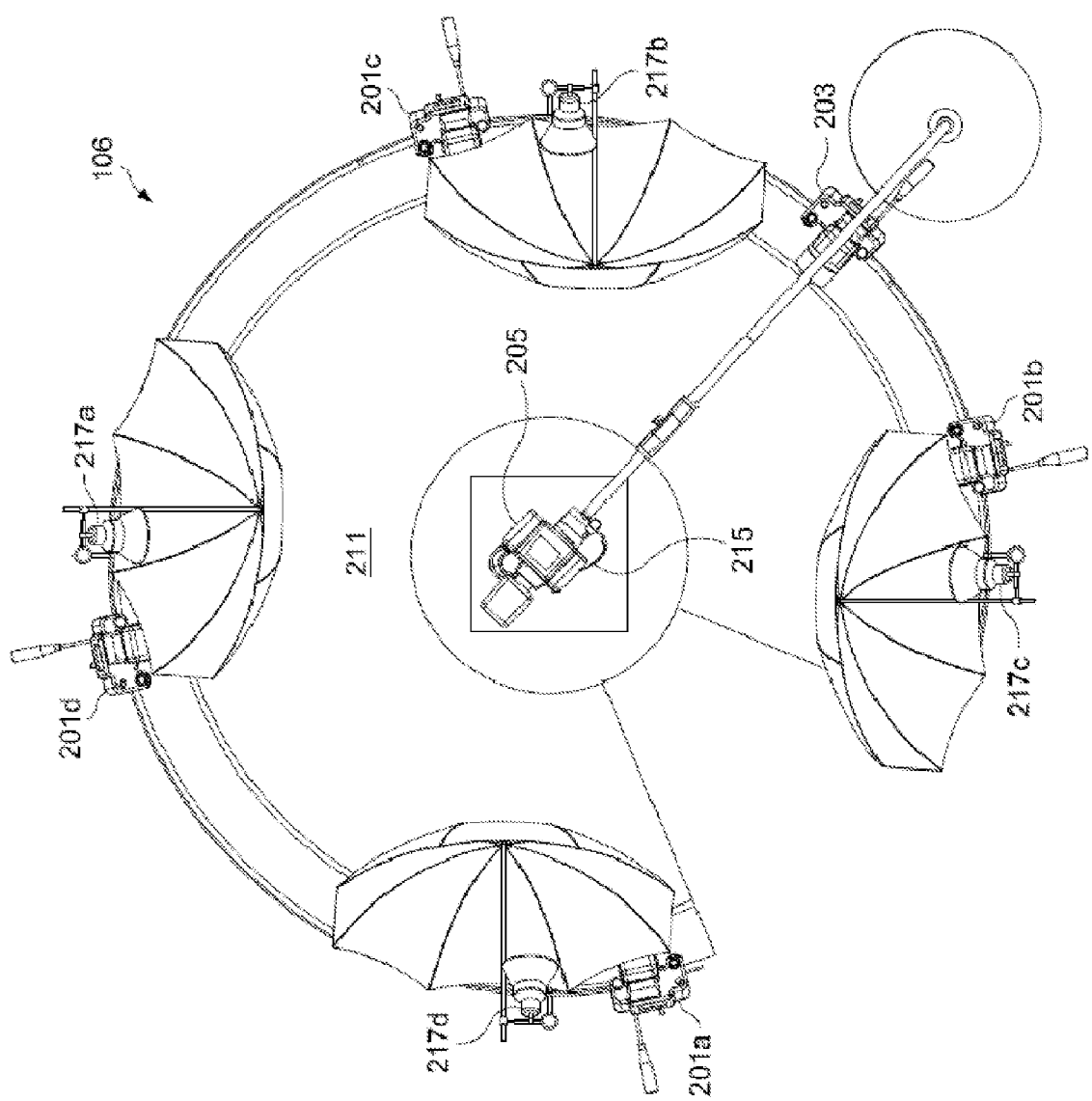

Reference is now made to FIG. 3, which illustrates a top-plan view of the image capture apparatus 106 shown in FIG. 2. FIG. 3 illustrates the orientation of the image capture devices relative to one another. As shown in the example of FIG. 3, the image capture devices 201a, 201b, 201c, and 201d are offset approximately ninety degrees from one another in a spherical axis. In other words, image capture device 201a is offset approximately ninety degrees from image capture device 201b, which is offset approximately ninety degrees from image capture device 201c, which is offset approximately ninety degrees from image capture device 201d. The image capture device 203 can be positioned such that it is oriented forty-five degrees offset from at least one of the image capture devices 201a, 201b, 201c, and/or 201d. Accordingly, an item 215 can be positioned within the semi-spherical structure 211 such that the image capture devices 201a, 201b, 201c, and 201d capture product images of the item 215 from front, rear, and opposing side views or perspectives. In this scenario, the image capture device 203 can capture a product image from an angled view or perspective. The image capture device 205 can be positioned substantially directly above the target position such that it captures a top plan view of the item 215.

Additionally, in the depicted example, the page generation application 115 can also initiate capture of a second series of product images, for example, after the item 215 has been turned on a side so that one or more images of the item 215 from a varying vantage point can be captured and transmitted to the page generation application 215 by the image capture devices. For example, such a workflow can be employed to capture an image of the bottom of the item 215 as well as various other images of the item 215 when the item 215 is upright. In one embodiment, the page generation application 115 can initiate capture of images in all of the image capture devices, which can be transmitted from the image capture devices to the page generation application 115. Subsequently, after an operator rotates the item 215 in the target position, the page generation application 115 can initiate an additional one or more series of image capture, which can be initiated in potentially a different number of image capture devices from the image capture apparatus 106 depending on the product image requirements desired.

An operator can also initiate image capture via the page generation application 115 in a user interface that can be provided via an input device such as a touchscreen, keyboard, mobile device, or any other input device. Additionally, an operator can also input an item identifier that is associated with the item 215 via a user interface provided by the page generation application 115. In one embodiment, the operator can input an item identifier by capturing a universal product code or other identifier that is encoded in a bar code, quick response code, radio frequency identification tag, or any other mechanism by which an item identifier can be encoded and subsequently captured with an input device in communication with the page generation application 115. The page generation application 115 can also provide a user interface that allows the user to view images captured by the various image capture devices as well as tag each of the images with an appropriate identifier indicating which view of the item that the image represents.

Figure 4:
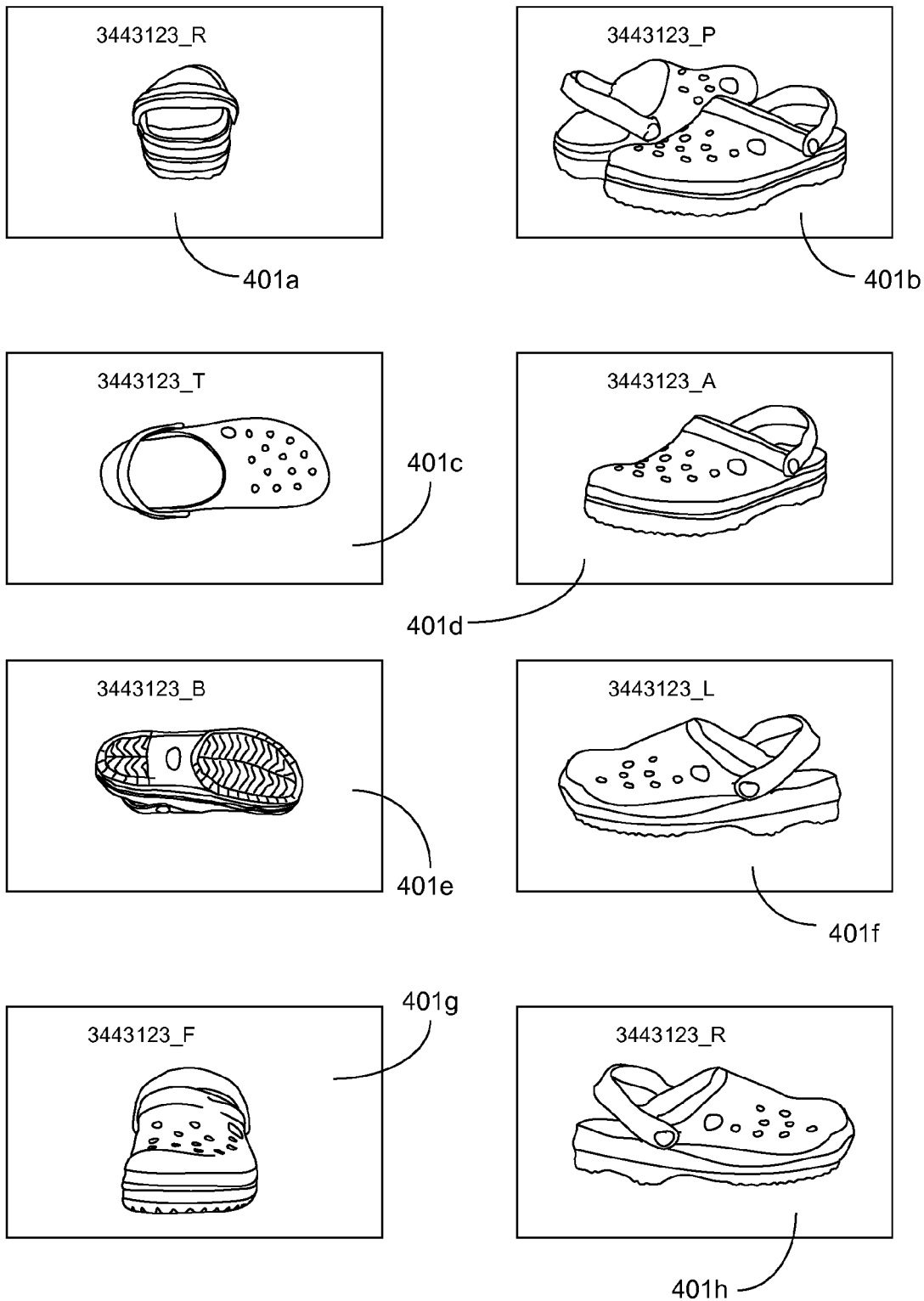
FIG. 4 is an example set of product images captured by the image capture apparatus of FIGS. 2-3 according to various embodiments of the present disclosure.

Referring next to FIG. 4, shown is one example of a series of product images 401a, 401b, 401c, 401d, 401e, 401f, 401g, and 401h that can be captured in the image capture apparatus 106 and then processed by the page generation application 115 for publication in a content page. In the depicted example, the page generation application can receive the various product images and can adjust the images to a common pixel resolution that may be required by design guidelines for a merchant's website, a print publication, or any other restriction. As another example, the page generation application 115 can remove any background or background artifacts in an image that is captured by the image capture apparatus 106. The page generation application 115 can also perform any other type of image normalization or post-processing of the product images received from the image capture apparatus 106. Additionally, the page generation application 115 can provide a user interface that allows an operator to perform post processing and/or image adjustments such that the images are appropriate for publication.

The page generation application 115 can also generate an image identifier for each of the images so that they can be appropriately inserted and/or referenced in a content page in which they are incorporated. In one embodiment, the image identifier can comprise a combination of an item identifier and one or more characters that identify which view of a product to which the image corresponds. In the depicted non-limiting example, the image identifier can include a product identifier combined with one or more characters from which a view or capture angle of the item to which the image corresponds. Because the page generation application 115 can initiate image capture via the image capture apparatus 106 and be configured with information about which images received from the image capture apparatus are captured by which of the image capture devices in the apparatus, the page generation application 115 can designate an image identifier to each of the received images.

For example, product image 401a is associated with an image identifier that includes the item identifier as well as one or more characters that identify the image as a rear view of the item. Product image 401b is associated with an image identifier that includes the item identifier as well as one or more characters that identify the image as one including a pair of footwear rather than only one piece of footwear, and so on. Accordingly, the page generation application can then store the captured product images in the data store 112 as images 129 that are indexed by the image identifier 131, which, as noted above, can include some form of the item identifier 127 as well.

Therefore, in order to generate a content page 133, the page generation application 115 can retrieve a page template from the network page data 130 as well as the appropriate images 129, and place the images 129 in an appropriate location in the content page 133 as specified by the page template. In other words, the page template can include references in various locations within the page template to images 129. For example, a page template corresponding to a product detail page can include reference at a specific location to an image 129 corresponding to a bottom view of an item 124 as well as other views. Accordingly, the page generation application 115 can generate a content page by replacing such a reference with a reference to the appropriate image 129 of the item 124. As noted above, the image identifier 131 can be based upon an item identifier 127 and a view of the item 124 that the image represents. Therefore, the content page 133 generated by the page generation application 115 that corresponds to a particular item 124 can include references to the images 129 corresponding to a particular item 124 with the appropriate images placed in the appropriate location in the content page 133 as specified by the page template.

Figure 5:
FIGS. 5-6 are drawings of examples of content pages generated by the page generation application executed in the computing device of FIG. 1 according to various embodiments of the present disclosure.

Reference is now made to FIG. 5, which illustrates one example of a content page that can be generated by the page generation application 115 according to various embodiments of the disclosure. In the example of FIG. 5, the content page 501 is a product detail page that displays information as well as imagery of an item from a product catalog. In the depicted example, the format of the product detail page can be standardized across the various range of products offered by an online merchant. In other words, the online merchant may impose style guidelines that call for specific views or images 129 of an item 124 to be placed in a specific location within the content page 501 as defined by a page template.

Figure 6:

Accordingly, as shown in the example of FIG. 5, the page template on which the content page 501 in based includes an image module 503 in which the various images 129 of an item 124 can be placed. The image module 503 can comprise HTML, Javascript, or any other content rendering code that facilitates display of images in a client. The image module 503 includes a specific location for a particular view of the item 124 (e.g., the bottom view of the item 124). Accordingly, the content page 501 generated by the page generation application 115 can be generated with a reference to the appropriate image 129, where the reference is based upon the image identifier 131. Continuing this example, reference is made to FIG. 6, which illustrates how the page generation application 115 can generate the content page 501 with a reference in the image module 503 to the appropriate image 129 in the location specified by the page template on which the content page 501 is based.

Figure 7:
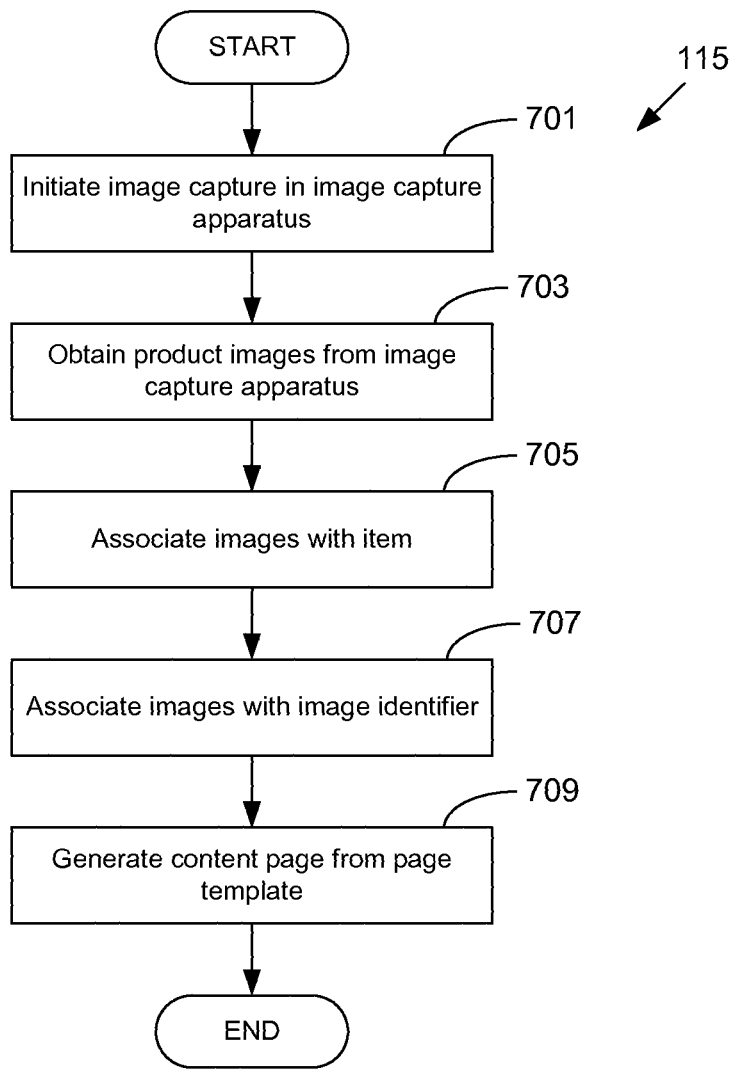
FIG. 7 is a flowchart illustrating one example of functionality implemented as portions of a page generation application executed in a computing device of FIG. 1 according to various embodiments of the present disclosure.

Referring next to FIG. 7, shown is a flowchart that provides one example of the operation of a portion of the page generation application 115 according to various embodiments. It is understood that the flowchart of FIG. 7 provides merely an example of the many different types of functional arrangements that may be employed to implement the operation of the portion of the page generation application 115 as described herein. As an alternative, the flowchart of FIG. 7 may be viewed as depicting an example of steps of a method implemented in the computing device 103 (FIG. 1) according to one or more embodiments.

First, in box 701, the page generation application 115 can initiate image capture of product images 121 in the image capture apparatus 106. As noted above, the image capture process can be facilitated by an operator and capture various views or angles of an item in the target position of the image capture apparatus 106. In box 703, the page generation application 115 can obtain the product images from the image capture apparatus 106. In box 705, the page generation application 115 can associate each of the images with the item. In some embodiments, the images can be associated with the item identifier.

In box 707, the page generation application can associate the images with an image identifier. The image identifier uniquely describes the image such that the page generation application 115 can identify an item 124 to which it corresponds as well as a view of the item 124 that is represents. In box 709, the page generation application 115 generates a content page that incorporates the captured product images based upon a page template. Because the image identifier allows the page generation application 115 to uniquely identify an image 129, the content page generated by the page generation application 115 can place the appropriate images in an appropriate location of the content page as specified by the page template.

Figure 8:
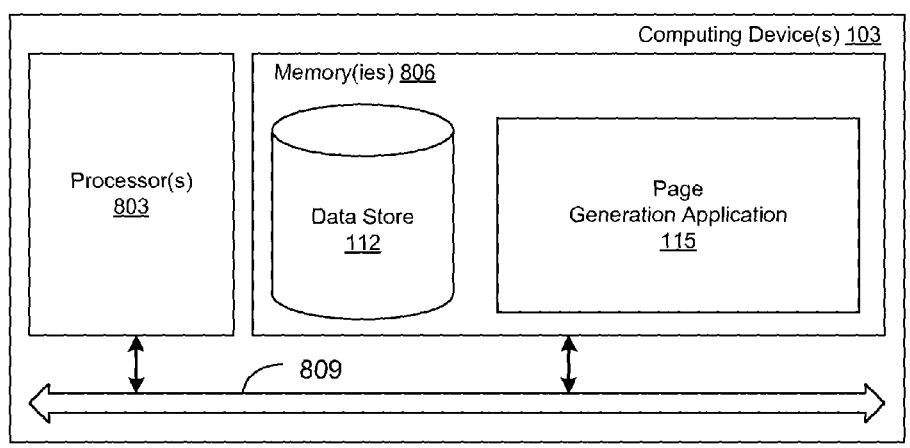
FIG. 8 is a schematic block diagram that provides one example illustration of a computing device of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are page generation application 115 and potentially other applications. Also stored in the memory 806 may be a data store 112 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the page generation application 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows the functionality and operation of an implementation of portions of the page generation application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the page generation application 115, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, the at least one program having instructions that perform a method comprising:

initiating, by the at least one computing device, capture of a plurality of images of an item in an image capture apparatus;

retrieving, by the at least one computing device, the plurality of images from at least one image capture device of the image capture apparatus;

associating, by the at least one computing device, the plurality of images with an item identifier, wherein the item identifier uniquely identifies the item with respect to other items;

associating, by the at least one computing device, the plurality of images with an image identifier, the image identifier identifying a respective view associated with a respective one of the plurality of images;

retrieving, by the at least one computing device, a page template associated with a content page; and generating, by the at least one computing device, the content page from the page template, the content page including a plurality of references to at least a subset of the plurality of images, the plurality of references facilitating retrieval of the at least a subset of the plurality of images by a client.

2. The non-transitory computer-readable medium of claim 1, wherein the image capture apparatus comprises a semi-spherical structure having at least one image capture device.

3. The non-transitory computer-readable medium of claim 2, wherein the at least one image capture device is aimed at a target position that is centrally located within the semi-spherical structure.

4. The non-transitory computer-readable medium of claim 1, wherein the page template specifies a location within the content page for at least a subset of the plurality of images.

5. The non-transitory computer-readable medium of claim 1, wherein associating, by the at least one computing device, the plurality of images with an image identifier further comprises generating, by the at least one computing device, an image identifier based upon a particular view to which a respective one of the images corresponds.

6. A system, comprising:
   at least one computing device; and
   a network page generation application executable in the at least one computing device, the network page generation application causing the at least one computing device to perform a method comprising:
      obtaining, by the at least one computing device, a plurality of images of an item from an image capture apparatus;
      associating, by the at least one computing device, the plurality of images with an item identifier;
      designating, by the at least one computing device, an image identifier to each of the plurality of images; and
      generating, by the at least one computing device, a content page associated with an item corresponding to the item identifier, the content page based upon a page template comprising at least one reference to at least one of the plurality of images.

7. The system of claim 6, wherein a location in the content page of the at least one reference is determined based at least upon the image identifier.

8. The system of claim 6, wherein the item identifier further comprises at least one of: a unique product identifier, a product style identifier, or a product description.

9. The system of claim 6, wherein generating, by the at least one computing device, a content page associated with an item corresponding to the item identifier further comprises generating, by the at least one computing device, a product detail page comprising at least a subset of the plurality of images and product data associated with the item.

10. The system of claim 6, wherein designating, by the at least one computing device, an image identifier to each of the plurality of images further comprises generating, by the at least one computing device, the image identifier based at least in part upon the item identifier and a view associated with a respective one of the plurality of images.

11. The system of claim 10, wherein the view associated with a respective one of the plurality of images is associated with an angle from which the respective one of the plurality of images is captured by the image capture apparatus.

12. The system of claim 10, wherein the page template comprises a module for each of the plurality of images, each module displaying one of the plurality of images, and generating the content page associated with the item corresponding to the item identifier further comprises:

identifying, by the at least one computing device, a respective module corresponding to a respective view of the item, the identifying performed based at least in part upon a respective image identifier; and inserting, by the at least one computing device, a reference in the respective module to the respective one of the plurality of images.

13. The system of claim 6, wherein the image capture apparatus is configured to capture each of the plurality of images from a respective one of a plurality of angles relative to the item.

14. The system of claim 13, wherein the image capture apparatus comprises a plurality of image capture devices oriented at varying angles relative to the item.

15. The system of claim 6, further comprising associating, by the at least one computing device, the plurality of images obtained by the image capture apparatus with a product identifier corresponding to an item in a product catalog.

16. A method, comprising:

initiating, in at least one computing device, capture of a plurality of images of an item by a plurality of image capture devices;

designating, in the at least one computing device, an image identifier to each of the plurality of images; and generating, in the at least one computing device, a page template associated with an item, the page template corresponding to a product detail page and comprising a plurality of references, each of the references corresponding to a respective one of the plurality of images.

17. The method of claim 16, wherein a location in the page template of each of the references is determined based at least in part upon the image identifier.

18. The method of claim 17, further comprising cropping each of the plurality of images to a common resolution.

19. The method of claim 18, wherein the common resolution corresponds to a size of the location in the page template.

20. The method of claim 16, wherein the page template comprises a respective module for each of the plurality of images, each module displaying one of the plurality of images.

* * * * *